(12) United States Patent
Peng et al.

(10) Patent No.: US 10,571,787 B2
(45) Date of Patent: Feb. 25, 2020

(54) PROJECTION DEVICE

(71) Applicant: Coretronic Corporation, Hsin-Chu (TW)

(72) Inventors: Ken-Teng Peng, Hsin-Chu (TW); Kun-Chen Hsu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/390,012

(22) Filed: Apr. 22, 2019

(65) Prior Publication Data

US 2019/0391469 A1    Dec. 26, 2019

(30) Foreign Application Priority Data

Jun. 25, 2018   (CN) ..................... 2018 2 0979430 U

(51) Int. Cl.
  *G03B 21/14*   (2006.01)
  *H04N 9/31*    (2006.01)

(52) U.S. Cl.
  CPC ......... *G03B 21/145* (2013.01); *H04N 9/3141* (2013.01)

(58) Field of Classification Search
  CPC ...... G03B 21/145; G03B 21/14; G03B 21/16; H04N 9/3141; H04N 9/3144
  USPC ......................................................... 353/119
  See application file for complete search history.

(56) References Cited

U.S. PATENT DOCUMENTS

2017/0366790 A1*  12/2017  Jobi ....................... H04N 9/315

FOREIGN PATENT DOCUMENTS

| CN | 204230850 U | 3/2015 |
| CN | 205105495 U | 3/2016 |

\* cited by examiner

*Primary Examiner* — Ryan D Howard

(57) ABSTRACT

A projection device includes a light source module, a light engine module and a projection lens. The light source module is used for emitting an illumination beam. The light engine module is used for receiving the illumination beam and converting the illumination beam into an image beam. The light engine module includes a first shell, a second shell, an elastic sealing member and an electronic component. The second shell and the first shell are combined with each other to form an accommodation space. The elastic sealing member is disposed between the first shell and the second shell for sealing a junction of the first shell and the second shell. The electronic component connects with a transmission cable. The transmission cable is penetratingly disposed at the elastic sealing member to penetrate out of the first shell and the second shell. The projection lens is used for receiving and projecting the image beam.

9 Claims, 3 Drawing Sheets

PROJECTION DEVICE

CROSS-REFERENCE TO RELATED APPLICATION

This application claims the priority benefit of China application (CN201820979430.6), filed on 2018 Jun. 25. The entirety of the above-mentioned patent application is hereby incorporated by reference herein and made a part of this specification.

FIELD OF THE INVENTION

The invention relates to a display device, and more particularly to a projection device.

BACKGROUND OF THE INVENTION

A projection device processes an illumination beam provided by a light source into an image beam by a light engine module, and then the image beam is projected onto a screen by a projection lens to form an image on the screen. The light engine module includes a plurality of optical elements. In order to prevent dust from contaminating the optical elements and affecting the display quality, the optical elements are usually covered with a dustproof casing inside the projection device.

Since an electronic component of the light engine module is also covered in the dustproof casing, an opening is required on the top wall of the dustproof casing for a transmission cable connecting with the electronic component to penetrate out of the dustproof casing, and the opening needs to be sealed with a rubber member to prevent dust from entering the dustproof casing from the opening. Therefore, the conventional projection device takes more time to assemble. If automated production equipment is to be utilized, complex clamps and robotic arms need to be added, resulting in high costs.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

The invention provides a projection device to improve assembly efficiency.

Other advantages and objects of the invention may be further illustrated by the technical features broadly embodied and described as follows.

In order to achieve one or a portion of or all of the objects or other objects, the projection device provided by the invention includes a light source module, a light engine module and a projection lens. The light source module is used for emitting an illumination beam. The light engine module is disposed on a transmission path of the illumination beam for receiving the illumination beam and converting the illumination beam into an image beam. The light engine module includes a first shell, a second shell, an elastic sealing member and an electronic component. The second shell and the first shell are combined with each other in a first direction to form an accommodation space. The elastic sealing member is disposed between the first shell and the second shell for sealing a junction of the first shell and the second shell. The electronic component is disposed in the accommodation space. The electronic component connects with at least one transmission cable. The at least one transmission cable is penetratingly disposed at the elastic sealing member to penetrate to outside of the first shell and the second shell. The projection lens is used for receiving the image beam and projecting the image beam to outside of the projection device.

In the projection device of the embodiments of the invention, the transmission cable penetrates out of the first shell and the second shell of the light engine module via the elastic sealing member between the first shell and the second shell. Compared to the conventional technology where a rubber member is additionally required to seal the opening from which the transmission cable penetrates out, the projection device of the embodiments of the invention can simplify the process of assembly and improve assembly efficiency. Moreover, because the process of assembly is relatively simpler, the cost of automation equipment can be reduced if automated production is to be performed.

Other objectives, features and advantages of The invention will be further understood from the further technological features disclosed by the embodiments of The invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing", "faces", and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
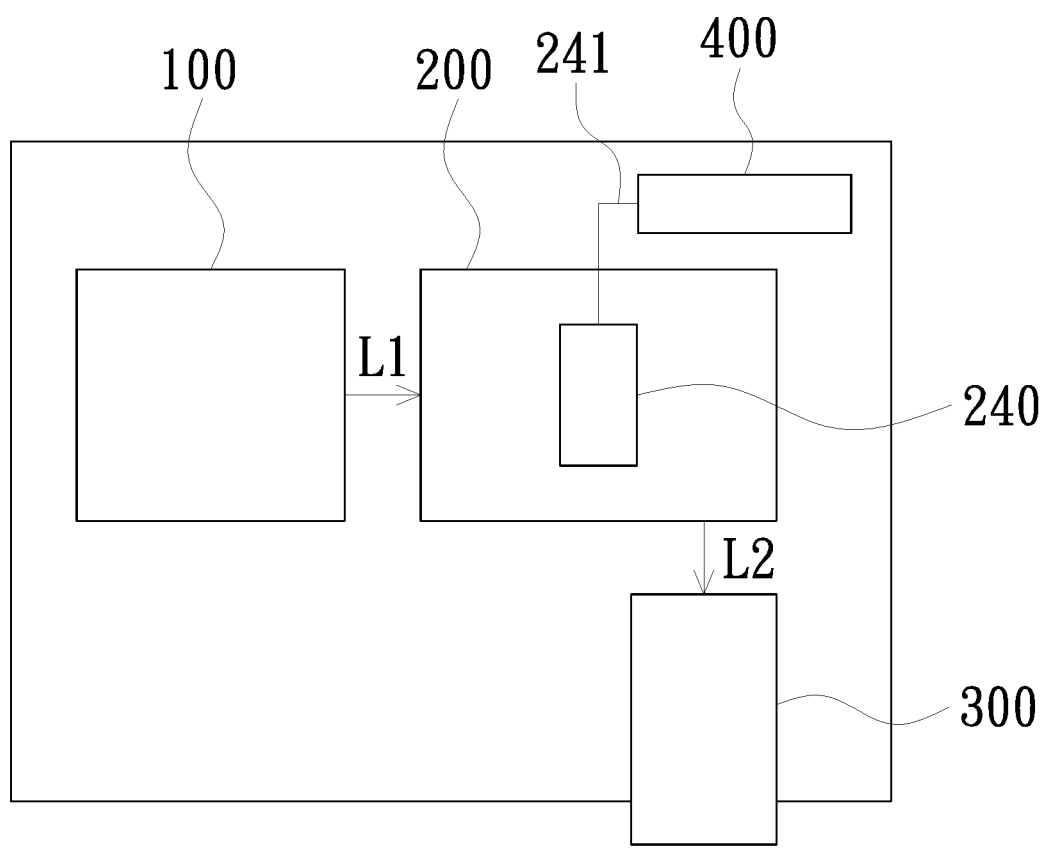
FIG. 1 is a schematic block diagram of a projection device according to an embodiment of the invention.

FIG. 1 is a schematic block diagram of a projection device according to an embodiment of the invention. Please refer to FIG. 1. A projection device 10 of the embodiment includes a light source module 100, a light engine module 200 and a projection lens 300. The light source module 100 is used for emitting an illumination beam L1. The light engine module 200 is disposed on a transmission path of the illumination beam L1. The light engine module 200 can be used for receiving the illumination beam L1 and converting the illumination beam L1 into an image beam L2. The projection lens 300 is disposed on a transmission path of the image beam L2 and can be used for receiving the image beam L2 and projecting the image beam L2 to outside of the projection device 10, for example, to a screen to form an image on the screen.

The light source module 100 may include a light bulb (such as a halogen bulb, a high pressure mercury lamp, etc.), a light-emitting diode light source, a laser light source or other kinds of light sources.

The light engine module 200 includes a light valve (not shown in the figure) for converting the illumination beam L1 into the image beam L2. The light valve may be a transmissive light valve or a reflective light valve, wherein the transmissive light valve may be a transmissive liquid crystal panel, and the reflective light valve may be a digital micromirror device (DMD) or a liquid crystal on silicon panel (LCOS panel), but the invention is not limited thereto. The light engine module 200 further includes at least one electronic component 240 (illustrated in FIG. 1 only by one). For example, the light engine module 200 may include: a wheel for causing the illumination beam L1 to form beams with different colors in time sequence, such as a filter wheel and a wavelength conversion wheel; a wheel detection element for detecting the rotation of a wheel; or an actuator which can move a light spot of the illumination beam L1 projected to the light valve by a distance of half a pixel to improve image resolution.

The electronic component 240 connects with a transmission cable 241. The projection device 10 further includes, for example, a motherboard 400. The motherboard 400 is electrically connected to the electronic component 240 by the transmission cable 241. The motherboard 400 can be used for controlling the electronic component 240 or receiving an electrical signal provided by the electronic component 240.

The projection lens 300 includes, for example, a combination of one or more optical lenses having a diopter, such as various combinations of non-planar lenses including biconcave lenses, biconvex lenses, concavo-convex lenses, convexo-concave lenses, plano-convex lenses, and plano-concave lenses, etc. In an embodiment, the projection lens 300 may also include planar optical lenses. The invention does not limit the configuration and the type of the projection lens 300.

Figure 2:
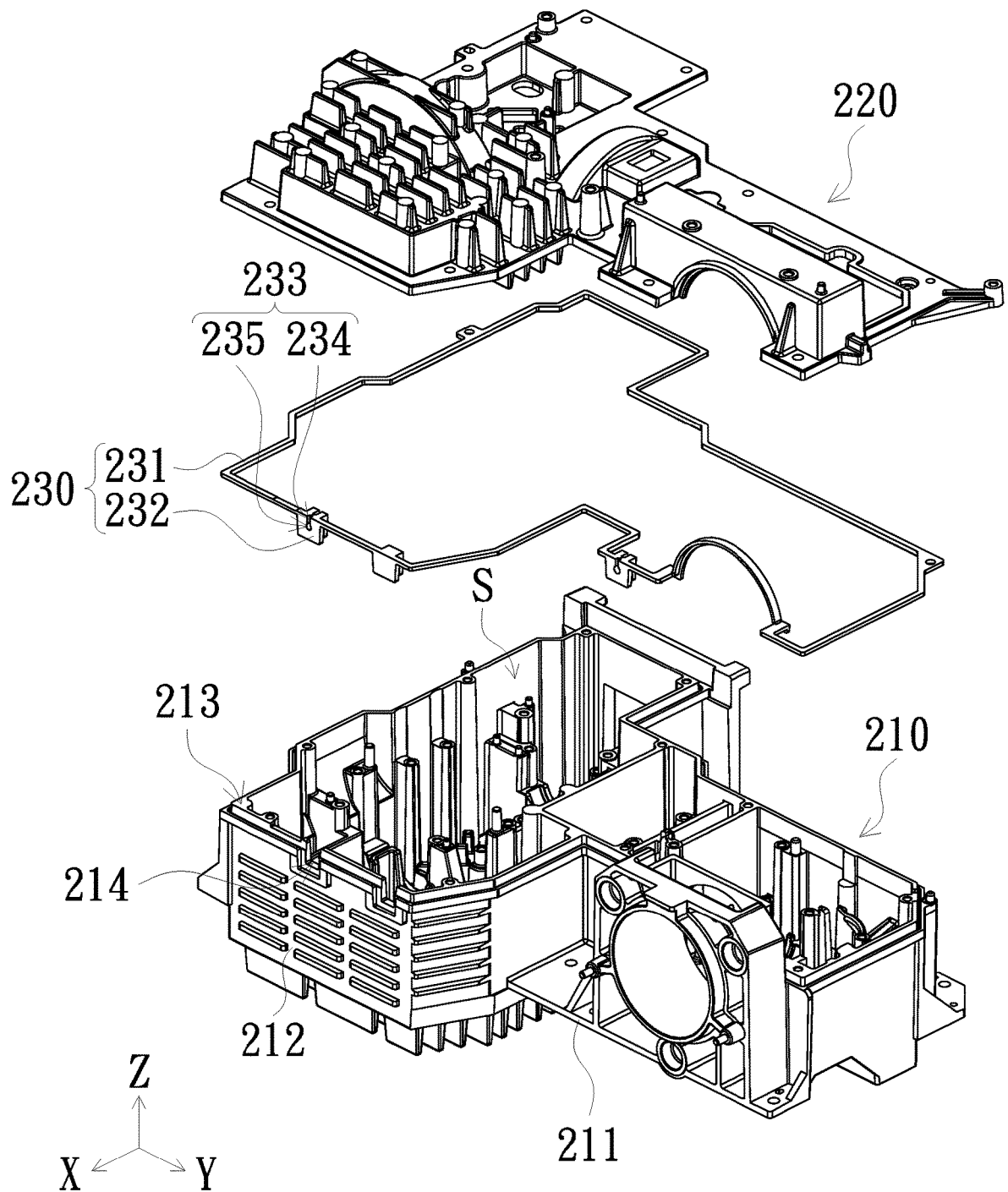
FIG. 2 is a schematic exploded view of a first shell, a second shell and an elastic sealing member of a light engine module according to an embodiment of the invention.
Figure 3:
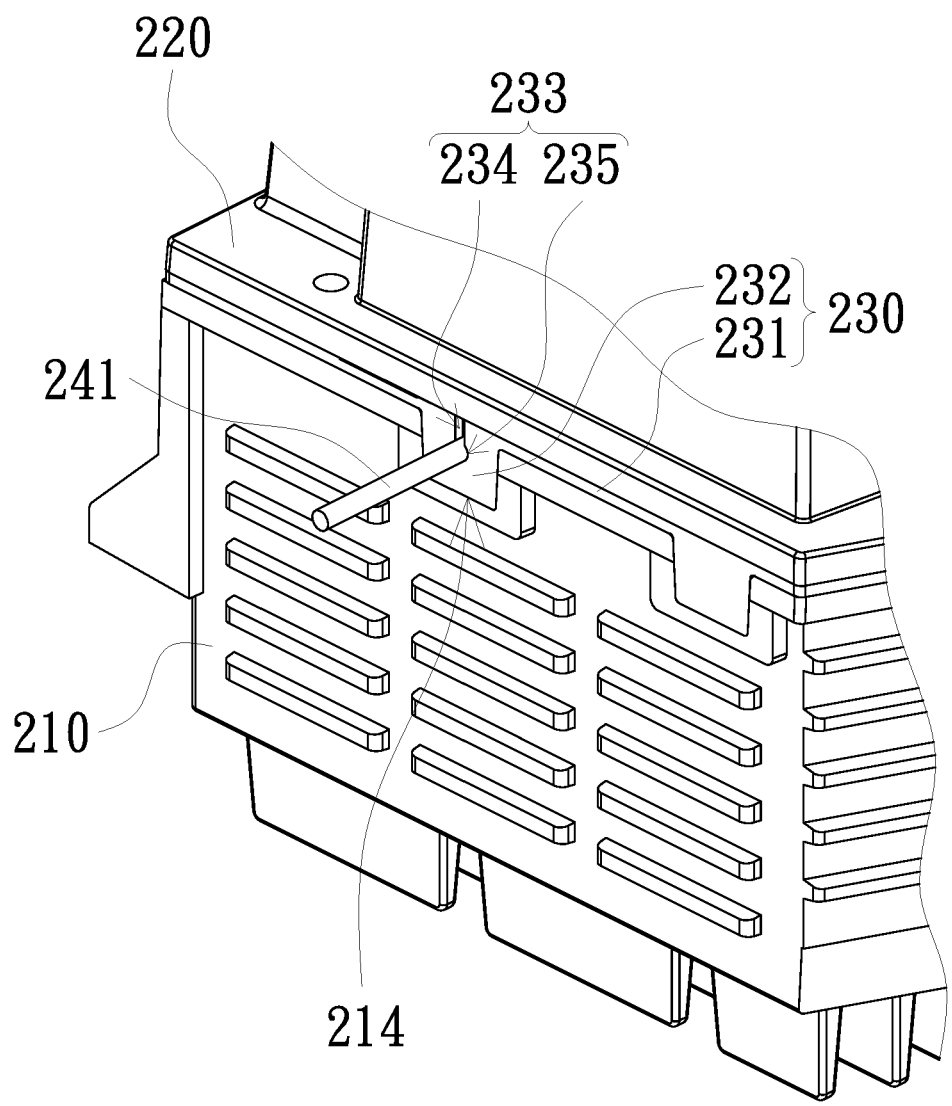
FIG. 3 is a schematic view of a transmission cable connecting with an electronic component penetrating out of the first shell and the second shell according to an embodiment of the invention.

FIG. 2 is a schematic exploded view of a first shell, a second shell and an elastic sealing member of the light engine module according to an embodiment of the invention. FIG. 3 is a schematic view of a transmission cable connecting with an electronic component penetrating out of the first shell and the second shell according to an embodiment of the invention. Please refer to FIG. 2 and FIG. 3. The light engine module 200 further includes a first shell 210, a second shell 220 and an elastic sealing member 230. The second shell 220 and the first shell 210 are combined with each other in a first direction (for example, the Z-axis direction) to form an accommodation space S. In the embodiment, a junction surface of the second shell 220 and the first shell 210 is, for example, an XY plane, and the first direction is, for example, perpendicular to the XY plane. In addition, the elastic sealing member 230 is disposed between the first shell 210 and the second shell 220 for sealing the junction of the first shell 210 and the second shell 220. The electronic component 240 of FIG. 1 is disposed in the accommodation space S, and the transmission cable 241 connecting with the electronic component 240 can be penetratingly disposed at the elastic sealing member 230 to penetrate out of the first shell 210 and the second shell 220. Specifically, one end of the transmission cable 241 is located in the accommodation space S and is electrically connected to the electronic component 240. The other end of the transmission cable 241 penetrates the elastic sealing member 230 and is located outside the first shell 210 and the second shell 220, so that the transmission cable 241 can be connected to the motherboard 400 of FIG. 1. The transmission cable 241 is penetratingly disposed at the elastic sealing member 230 along a second direction, and the second direction is, for example, perpendicular to the first direction. For example, the second direction may include an X-axis direction, a Y-axis direction and other directions parallel to the XY plane, but the invention is not limited thereto. In addition, the material of the elastic sealing member 230 may include rubber or other elastic materials.

The first shell 210 has a bottom wall 211 and a plurality of side walls 212. The side walls 212 are connected to the bottom wall 211 and surround the bottom wall 211. A top surface 213 of at least one of the side walls 212 facing the second shell 220 has at least one groove 214. In other words, the top surface 213 of each of the side walls 212 can be provided with one or a plurality of grooves 214 as needed, and the top surfaces 213 of some of the side walls 212 may not be provided with the groove 214. The groove 214 is used for allowing the transmission cable 241 connecting with the electronic component 240 to penetrate out of the first shell 210 and the second shell 220. Therefore, the number and position of the groove 214 are matched with the number and position of the electronic component 240, but the number of the groove 214 and the number of the electronic component 240 are not limited to one-to-one. In addition, the elastic sealing member 230 has, for example, a sealing strip 231 and at least one sealing block 232. The sealing strip 231 seals the junction of the first shell 210 and the second shell 220. The contour of the sealing strip 231 corresponds to the contour of the junction of the first shell 210 and the second shell 220. Each sealing block 232 is individually formed by extending from the sealing strip 231 along the first direction, and the sealing block 232 corresponds to an interior of the groove 214. That is, an external force may be applied along the first direction to fasten the sealing block 232 in the groove 214.

The elastic sealing member 230 in the embodiment further has, for example, at least one trench 233. Each trench 233 extends from the sealing strip 231 along the first direction into the corresponding sealing block 232. The trench 233 includes, for example, a straight ditch 234 and an accommodation hole 235. The straight ditch 234 extends from the sealing strip 231 along the first direction into the corresponding sealing block 232. The accommodation hole 235 is located in the corresponding sealing block 232 and is connected to the straight ditch 234. The transmission cable 241 of FIG. 1 can enter the corresponding accommodation hole 235 along the first direction via the corresponding straight ditch 234 and be accommodated in the corresponding accommodation hole 235. That is, before the combination of the first shell 210 and the second shell 220, an external force may be applied to move the transmission cable 241 downwards along the first direction via the straight ditch 234 to fix the transmission cable 241 to the accommodation hole 235, and then the second shell 220 is combined with the first shell 210. In addition, a maximum width of the accommodation hole 235 is, for example, greater than a maximum width of the corresponding straight ditch 234. A diameter of the accommodation hole 235 is, for example, matched to a diameter of the transmission cable 241 so as to avoid an oversized gap between the transmission cable 241 and a hole wall of the accommodation hole 235. In addition, since the maximum width of the straight ditch 234 is narrower than the maximum width of the accommodation hole 235, the chance of dust entering an interior of the light engine module 200 from the straight ditch 234 can be reduced.

Although the embodiment takes one accommodation hole 235 to accommodate one transmission cable 241 as an example, in other embodiments, it may also be designed that one accommodation hole 235 accommodates a plurality of transmission cables 241. In another embodiment, the trench 233 may also include only the straight ditch 234 without the accommodation hole 235. In addition, although the embodiment takes one elastic sealing member 230 as an example, in other embodiments, the junction between the first shell 210 and the second shell 220 may also be sealed by a plurality of elastic sealing members 230.

In the embodiment, since the transmission cable 241 connecting with the electronic component 240 penetrates out of the first shell 210 and the second shell 220 via the elastic sealing member 230 between the first shell 210 and the second shell 220, compared to the conventional technology where a rubber member is additionally required to seal the opening from which the transmission cable penetrates out, the projection device 10 of the embodiment can simplify the process of assembly and improve assembly efficiency. Moreover, because the process of assembly is relatively simpler, the cost of automation equipment can be reduced if automated production is to be performed.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first shell, the second shell, the first direction and the second direction are only used for distinguishing various elements and do not limit the number of the elements.

What is claimed is:

1. A projection device, comprising:
a light source module, for emitting an illumination beam;
a light engine module, disposed on a transmission path of the illumination beam and used for receiving the illumination beam and converting the illumination beam into an image beam, wherein the light engine module comprises:
a first shell;
a second shell, wherein the second shell and the first shell are combined with each other in a first direction to form an accommodation space;
an elastic sealing member, disposed between the first shell and the second shell for sealing a junction of the first shell and the second shell; and
at least one electronic component, disposed in the accommodation space, wherein the at least one electronic component connects with at least one transmission cable, and the at least one transmission cable is penetratingly disposed at the elastic sealing member to penetrate out of the first shell and the second shell; and
a projection lens, disposed on a transmission path of the image beam and used for receiving the image beam and projecting the image beam to outside of the projection device.

2. The projection device according to claim 1, wherein the first shell has a bottom wall and a plurality of side walls, the plurality of side walls are connected to the bottom wall and surround the bottom wall, and at least one top surface of at least one of the plurality of side walls facing the second shell has at least one groove.

3. The projection device according to claim 2, wherein the elastic sealing member has a sealing strip and at least one sealing block, the sealing strip seals the junction of the first shell and the second shell, the at least one sealing block is individually formed by extending from the sealing strip along the first direction, and the at least one sealing block corresponds to an interior of the at least one groove.

4. The projection device according to claim 3, wherein the elastic sealing member further has at least one trench, and the at least one trench individually extends from the sealing strip along the first direction into the at least one sealing block.

5. The projection device according to claim 4, wherein the at least one trench comprises a straight ditch and an accommodation hole, the straight ditch extends from the sealing strip along the first direction into the corresponding at least one sealing block, and the accommodation hole is located in the corresponding at least one sealing block and is connected to the straight ditch.

6. The projection device according to claim 5, wherein the transmission cable enters the corresponding accommodation hole along the first direction via the corresponding straight ditch and is accommodated in the corresponding accommodation hole, and a maximum width of the accommodation hole is greater than a maximum width of the corresponding straight ditch.

7. The projection device according to claim 1, wherein the at least one electronic component comprises at least one of a filter wheel, a wavelength conversion wheel, a wheel detection element and an actuator.

8. The projection device according to claim 1, wherein the at least one transmission cable is penetratingly disposed at the elastic sealing member along a second direction, and the second direction is perpendicular to the first direction.

9. The projection device according to claim 1, further comprising a motherboard, wherein the motherboard is electrically connected to the at least one electronic component by the transmission cable, and the motherboard is used for controlling the at least one electronic component or receiving an electrical signal provided by the at least one electronic component.

* * * * *